United States Patent
Sainaney et al.

(10) Patent No.: US 10,685,508 B2
(45) Date of Patent: Jun. 16, 2020

(54) RECONCILING OUTLIER TELEMATICS ACROSS MONITORED POPULATIONS

(71) Applicant: MOJ.IO INC., Vancouver (CA)

(72) Inventors: Narayan Sainaney, Vancouver (CA); Tejas Vora, Vancouver (CA)

(73) Assignee: MOJ.IO, Inc., Vancouver, BC (CA)

( * ) Notice: Subject to any disclaimer, the term of this patent is extended or adjusted under 35 U.S.C. 154(b) by 0 days.

(21) Appl. No.: 16/096,217

(22) PCT Filed: May 17, 2017

(86) PCT No.: PCT/CA2017/050597
§ 371 (c)(1),
(2) Date: Oct. 24, 2018

(87) PCT Pub. No.: WO2017/214713
PCT Pub. Date: Dec. 21, 2017

(65) Prior Publication Data
US 2019/0139334 A1    May 9, 2019

Related U.S. Application Data

(63) Continuation of application No. 15/184,771, filed on Jun. 16, 2016, now Pat. No. 9,846,979.

(51) Int. Cl.
*G07C 5/08* (2006.01)
*G07C 5/00* (2006.01)

(52) U.S. Cl.
CPC ........... *G07C 5/0808* (2013.01); *G07C 5/002* (2013.01); *G07C 5/008* (2013.01); *G07C 5/085* (2013.01); *G07C 5/0825* (2013.01)

(58) Field of Classification Search
CPC ...... G07C 5/0808; G07C 5/085; G07C 5/008; G07C 5/002; G07C 5/0825; G06Q 10/20
See application file for complete search history.

(56) References Cited

U.S. PATENT DOCUMENTS 6,609,051 B2 * 8/2003 Fiechter .............. G06F 11/2263
700/31
7,899,762 B2 3/2011 Iyengar et al.
(Continued)

FOREIGN PATENT DOCUMENTS

CA    2809689 A1    9/2014

OTHER PUBLICATIONS

Ferdowsi, H et al., "An Online Outlier Identification and Removal Scheme for Improving Fault Detection Performance," IEEE Transactions on Neural Networks and Learning Systems, vol. 25, No. 5, May 2014, 12 pages.

(Continued)

*Primary Examiner* — Rodney A Butler

(57) ABSTRACT

A computing system implements a telematics service that obtains a set of vehicle telematics data for each vehicle of a population. Within each set of vehicle telematics data, a set of time-based measurements for a measurement type is identified. The set of time-based measurements identified for each vehicle are combined to obtain a combined set of time-based observations for the measurement type across the population of vehicles or a sub-set of the population defined by vehicle make, model, and/or year of production. An outlier observation is identified from among the combined set of time-based observations. A determination is made whether the outlier observation is part of a temporary deviation or a persistent deviation. For a temporary deviation, an impact of the outlier observation on the set of time-based measurements is reduced. For a persistent deviation, the outlier observation is programmatically characterized.

20 Claims, 5 Drawing Sheets

(56) References Cited

U.S. PATENT DOCUMENTS

| | | |
|---|---|---|
| 2006/0161403 A1 | 7/2006 | Jiang et al. |
| 2007/0055477 A1 | 3/2007 | Chickering et al. |
| 2013/0289819 A1 | 10/2013 | Hassib et al. |
| 2016/0035150 A1 | 2/2016 | Barfield, Jr. et al. |

OTHER PUBLICATIONS

ISA Canadian Intellectual Property Office, International Search Report Issued in PCT Application No. PCT/CA2017/050597, Sep. 28, 2017, WIPO, 3 pages.

* cited by examiner

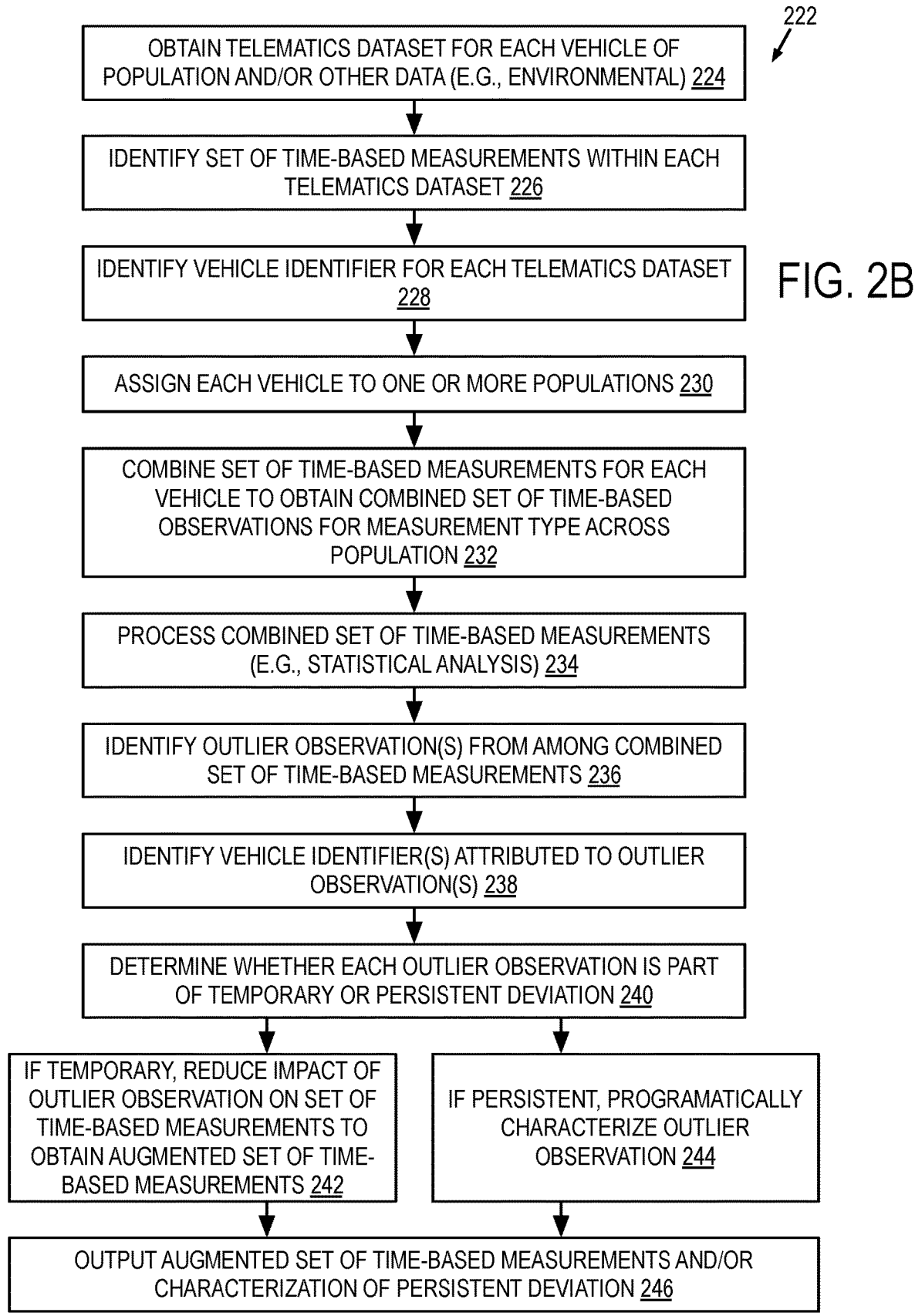

RECONCILING OUTLIER TELEMATICS ACROSS MONITORED POPULATIONS

CROSS-REFERENCE TO RELATED APPLICATIONS

The present application is a national phase application of PCT application number CA2017050597, titled ANALYZING TELEMATICS DATA WITHIN HETEROGENEOUS VEHICLE POPULATIONS, filed May 17, 2017, which claims the benefit of and priority to U.S. patent application Ser. No. 15/184,771, titled ANALYZING TELEMATICS DATA WITHIN HETEROGENEOUS VEHICLE POPULATIONS, filed Jun. 16, 2016, and issued as U.S. Pat. No. 9,846,979 on Dec. 19, 2017. The entire contents of these priority applications are incorporated herein by reference in their entirety for all purposes.

BACKGROUND

Modern vehicles typically include on-board electronic control and monitoring systems that manage, measure, and report operation of the vehicle's various subsystems. On-board electronic control and monitoring systems may include or otherwise support on-board diagnostic (OBD) services that enable vehicle owners and repair technicians to access diagnostic information or other forms of operational information from the control system. As one example, on-board electronic control systems of a vehicle may be accessed via a data interface in the form of a physical wired data link connector or data port. OBD information may be communicated over this data interface using a variety of protocols, including ALDL, OBD-I, OBD-1.5, OBD-II, etc.

SUMMARY

In an example, a computing system implements a telematics service. The telematics service obtains a set of vehicle telematics data for each vehicle of a population of vehicles. Within each set of vehicle telematics data, a vehicle identifier from which that set of vehicle telematics data originated and a set of time-based measurements for a measurement type are identified. The set of time-based measurements identified for each vehicle are combined to obtain a combined set of time-based observations for the measurement type across the population of vehicles or a sub-set of the population defined by vehicle make, model, and/or year of production. A statistical model is applied to the combined set of time-based observations to obtain a set of one or more probability distributions. An outlier observation is identified from among the combined set of time-based observations that is located outside of the set of probability distributions. For the outlier observation, the vehicle identifier attributed to the outlier observation is identified. A determination is made whether the outlier observation is part of a temporary deviation or a persistent deviation. For a temporary deviation, an impact of the outlier observation on the set of time-based measurements is reduced (e.g., filtered and/or harmonized) to obtain an augmented set of time-based measurements. For a persistent deviation, the outlier observation is programmatically characterized. The augmented set of time-based measurements and/or the characterization of the persistent deviation are output and reported to a subscriber associated with the vehicle identifier.

This summary describes only some of the concepts presented in greater detail by the following description and associated drawings. As such, claimed subject matter is not limited by the contents of this summary.

BRIEF DESCRIPTION OF DRAWINGS

FIGS. 2A and 2B are flow diagrams depicting example methods for a telematics service.

DETAILED DESCRIPTION

Vehicles are highly fragmented by make, model, and year of production. This diversity among vehicle populations makes it challenging to analyze telematics data across broad populations. Some measurements (e.g., fuel efficiency) may be reported consistently across a variety of different vehicles due to factors such as industry wide standardization or government imposed reporting requirements. Over time, however, vehicles may experience drift in the data on the CAN bus or may develop faulty or degraded components which can contribute to inaccurate or erroneous telematics data. Furthermore, telematics data may be momentary inaccurate or erroneous in real-world applications due to vehicle-specific events. For example, a fuel level reported by a vehicle may be temporarily incorrect due to accelerations or g-forces experienced by the vehicle that cause the fuel level sensor to provide an inaccurate measurement of the actual fuel level within the vehicle. These temporary deviations may be present in some or all of the various measurement types reported by vehicles as telematics data.

In accordance with an aspect of the present disclosure, telematics data collected from a broad population of diverse vehicle makes, models, and years of production may be used to generate a statistical model for that population. Additionally or alternatively, statistical models may be generated for subsets of the broad population that are defined by vehicle make, model, and year of production. These statistical models may be used to identify outliers within telematics data reported by vehicles within a given population, whether broad or specific to the vehicle make, model, or year of production. These statistical models may also be used to create and assign a normalized score (e.g., a fuel score) to individual vehicles for a particular measurement type across a given population of vehicles that serves as a proxy for comparison of telematics data within that population.

This framework enables anomalous telematics data to be identified and corrective action to be taken to reduce the impact of this anomalous telematics data on analysis results, reported performance of the vehicle, and normalized scoring of vehicles within a population. For example, a fuel score assigned to a particular vehicle and reported to its operator or owner may provide merit even when the absolute underlying data (e.g. fuel efficiency) is at least temporarily inaccurate or erroneous.

Figure 1:
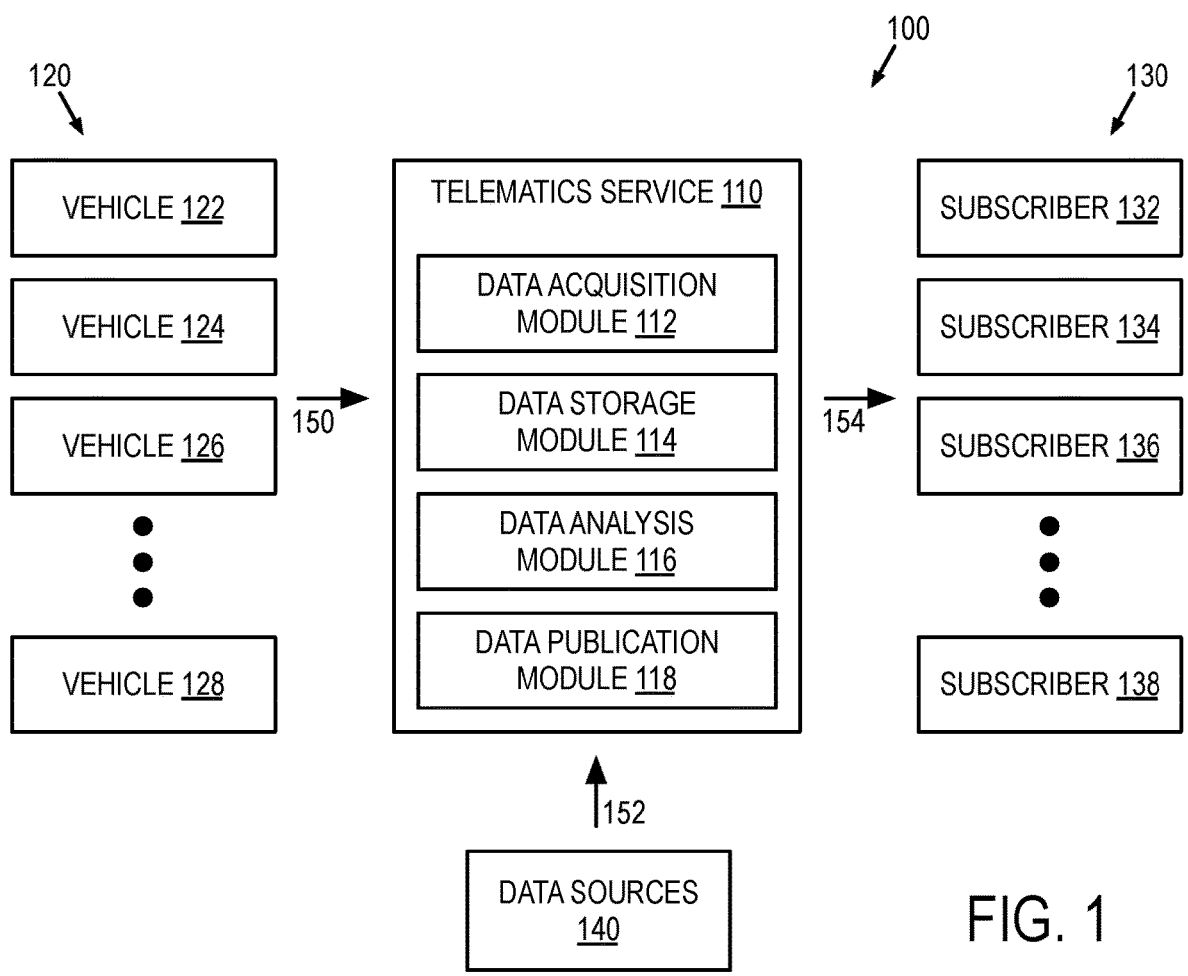
FIG. 1 is a schematic diagram depicting an operating environment for an example telematics service.

FIG. 1 is a schematic diagram depicting an operating environment 100 for an example telematics service 110. Within operating environment 100, a vehicle population 120 of a plurality of vehicles 122, 124, 126, 128, etc. reports telematics data 150 to telematics service 110. Vehicle population 120 may include a few, tens, hundreds, thousands, millions, or more vehicles. Some or all of the vehicles of vehicle population 120 may include a vehicle-based telematics system that receives telematics data from an electronic system of the vehicle (e.g., via an OBD interface) and/or generates telematics data from measurements obtained via sensors located on-board the vehicle. Telematics data 150 may be reported by vehicle-based telematics systems of vehicle population 120 to telematics service 110 over wireless and/or wired communication links of a communications network. A non-limiting example of a vehicle-based telematics system is described in further detail with reference to FIG. 3. Telematics service 110 may receive other suitable data 152 (e.g., environmental data) from other data sources 140 (e.g., non-vehicle-based sources).

Telematics data refers to: (1) any data representing measurements obtained via sensors located on-board a vehicle, (2) any data representing operating conditions or states identified by electronic systems located on-board the vehicle that are based on such measurements, (3) any data representing vehicle-specific information (e.g., a vehicle identifier, owner identifier, vehicle make, vehicle model, vehicle year of production, etc.), (4) any data representing metadata (e.g., timestamps) that describes other telematics data. Telematics data may be reported by vehicles in real-time, in near or pseudo real-time, or periodically/asynchronously. Telematics data may include data representing time-based measurements in which a plurality of measurements are associated with a range of respective time values and/or a plurality of measurements are ordered in a time-dependent sequence. For example, telematics data representing a fuel level for a vehicle over a period of time may be reported as a plurality of fuel level measurements for two or more different points in time within that period.

Environmental data may refer to measurements of ambient conditions such as temperature, air pressure, wind speed, lighting, the earth's albedo (which varies with the time of year), precipitation, etc. as well as abstracted measurements of weather conditions, traffic conditions, road conditions, etc. Environmental data may be reported by data sources 140 in real-time, in near or pseudo real-time, or periodically/asynchronously. Environmental data may also be included in telematics data in implementations where the vehicle includes on-board sensors that measure ambient environmental conditions. Environmental data may include data representing time-based measurements in which a plurality of measurements are associated with a range of respective time values and/or a plurality of measurements are ordered in a time-dependent sequence. Data sources may take the form of data reporting services that are hosted at a computing device or system that is connected to the telematics service via a communications network. Data sources 140 may additionally or alternatively include geographically distributed sensors that capture and report measurements of environmental conditions.

In at least some implementations, a time value associated with a particular measurement may refer to a world time that represents the time of day, day, month, year, etc. that the measurement was taken. World time may refer to the local time of the vehicle or non-vehicle-bases sensor, or may refer to the local time of the telematics service or an absolute world time referenced at another location or source. In other implementations, a relative time value may be associated with measurements within the telematics data or environmental data that enables the telematics service to reconstruct the world time that the measurements were taken. The geographic location of a particular vehicle or non-vehicle-based sensor contained in at least some of the telematics data or environmental data may be used in combination with localized time values associated with the measurements to determine a non-localized world time for the vehicle/sensor and its reported telematics/environmental data. This approach may be used, for example, to time-align measurements obtained from multiple vehicles and/or sensors located within different geographic time zones.

Vehicle-based telematics devices connect vehicles with network services and subscribers of telematics data. Connected vehicles may generate a large quantity of telematics data, such as event data, accident state data, location data, speed data, etc. Software developers can use these forms of data in combination with environmental data to create applications for connected vehicles and their subscribers. Telematics service 110 obtains telematics data 150 reported by vehicle population 120 and/or other suitable data 152 (e.g., environmental data) from other data sources 140 (e.g., non-vehicle-based data sources), processes the data, analyzes the data in raw and/or processed forms, and publishes analysis results and/or the data in raw and/or processed forms to a subscriber population 130 of a plurality of subscribers 132, 134, 136, 138, etc. Individual subscribers may refer to a user account, an email address, a telephone number, or other network destination that is accessible to a user via a computing device. Analysis results and/or data in raw and/or processed forms, as indicated at 154, may be published by telematics service 110 to individual subscribers or groups of subscribers of subscriber population 130 using push-based and/or pull-based subscription models.

Telematics service 110 may be implemented by a server system or other suitable computing system or platform. A non-limiting example of a server system implementing a telematics service is described in further detail with reference to FIG. 3. Telematics service 110 may include one or more modules that implement respective features of the telematics service. As a non-limiting example, telematics service 110 may include a data acquisition module 112 that manages acquisition of telematics data from vehicle population 120 and/or other suitable data (e.g., environmental data) from other data sources 140 (e.g., non-vehicle-based data sources), a data storage module 114 that manages storage and retrieval of such data in raw and/or processed forms, a data analysis module 116 that processes the data into processed forms and performs analysis of the raw and/or processed forms of such data to generate analysis results, and a data publication module 118 that publishes the analysis results and/or the data in raw and/or processed forms to subscribers of population 130.

As described in further detail with reference to FIGS. 2A and 2B, telematics service 110 may be implemented to collect telematics and environmental data as data streams, update a statistical model in real-time based on the data, compare real-time data received from a vehicle to a population and sample statistics for that population, determine if the telematics data is typical or anomalous within that population, determine a normalized score for a vehicle or a population of vehicles based on the statistical model, characterize anomalous telematics data as representing a pending issue with the vehicle, and output processed telematics data or analysis results to upstream services.

Figure 2A:
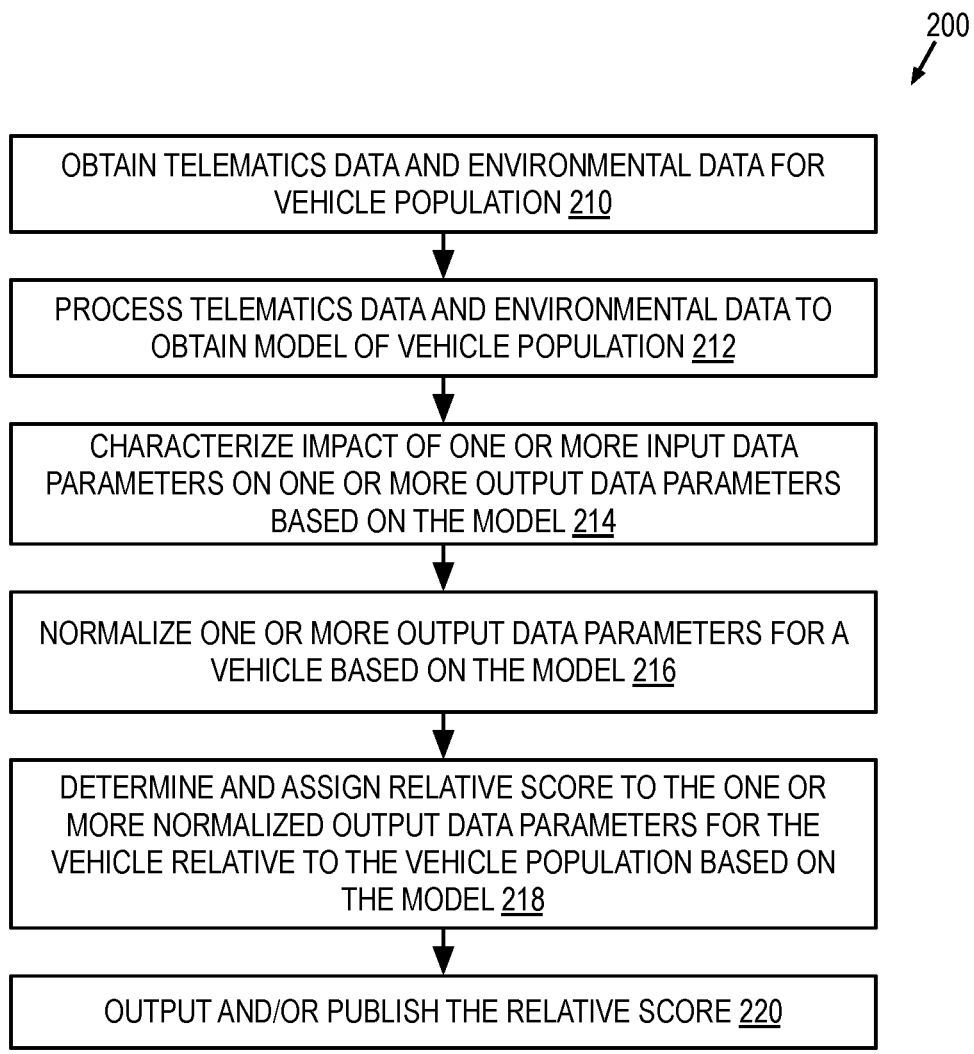

FIG. 2A is a flow diagram depicting an example method 200 for a telematics service. As a non-limiting example, method 200 may be performed by the previously described telematics service 110 of FIG. 1. Accordingly, method 200 may take the form of a computer-implemented method. As a non-limiting example, method 200 may be implemented by a server system that includes one or more server devices.

At 210, the method includes obtaining telematics data and environmental data for a vehicle population. An example vehicle population 120 was previously described with reference to FIG. 1. The vehicle population may refer to all vehicles served by the telematics service or a subset of all vehicles. For example, a vehicle population may refer to a particular type of vehicle, including model, brand, and year, for example. Further discussion of vehicle populations will be described with reference to FIG. 2B.

As previously described with reference to FIG. 1, the telematics data may be transmitted via a communications network from each vehicle of the vehicle population. The telematics data may be received by the telematics service via the communications network for each vehicle of the vehicle population. The telematics data may be obtained by a data acquisition module of the telematics service, and the telematics data may be stored in a database system by a data storage module. An example data acquisition module 112 and an example data storage module 114 of telematics service 110 were previously described with reference to FIG. 1.

Environmental data may be transmitted via a communications network from one or more data sources, including non-vehicle-based data sources. These non-vehicle-based data sources may include third-party environmental monitoring services that utilize geographically distributed sensors to measure environmental conditions. The telematics service may subscribe to environmental data that is reported by these third-party environmental monitoring services. An example of non-vehicle-based data sources 140 was previously described with reference to FIG. 1. The environmental data may be received by the telematics service via the communications network. The environmental data may include environmental data that is applicable to the geographic location(s) or region(s) for each vehicle of the vehicle population. For example, the telematics data may include measurements of the geographic location(s) or region(s) that each vehicle traveled within a given time frame. The environmental data may be obtained by a data acquisition module (112 of FIG. 1) of the telematics service, and the environmental data may be stored in a database system by a data storage module (e.g., 114 of FIG. 1).

At 212, the method includes processing the telematics data and environmental data to obtain a model of the vehicle population. The model may take the form of a statistical model in at least some implementations. Operation 212 may be performed by a data analysis module of the telematics service, such as previously described data analysis module 116 of FIG. 1. In an example, the data analysis module of the telematics service may utilize and/or apply machine learning to the telematics data and environmental data. For example, machine learning may be used to train a neural network that is used to detect and report patterns within a subject measurement type for a particular vehicle and the domain of that measurement type for all other vehicles of the vehicle population, including other measurement types that substantially influence the subject measurement type.

At 214, the method includes characterizing the impact of one or more input data parameters on one or more output data parameters based on the model. Here, input and output data parameters may refer to any measurement type within the telematics data or the environmental data. As a non-limiting example, a tire pressure (e.g., as a measurement type of the telematics data) and an ambient air temperature at the location of the vehicle (e.g., as a measurement type of the environmental data) may correspond to input data parameters, and fuel efficiency (e.g., as a measurement type of the telematics data) may correspond to an output data parameter. A world time representing the time of day, day, month, year, etc. that the measurement was taken, may additionally correspond to an input or output data parameter. In this example, the model may be used to characterize how tire pressure, ambient air temperature, and world time impact fuel efficiency across the vehicle population or for a given vehicle of the vehicle population. Operation 214 may be performed by the data analysis module of the telematics service. In at least some implementations, operation 214 may be performed for many different sets of input and output data parameters or for some or all permutations of the various data parameters contained in the telematics and environmental data.

At 216, the method includes normalizing one or more output data parameters for a vehicle based on the model. As an example, the model may be used to identify a domain of output data parameters for the vehicle population. One goal of this operation is to reduce the impact of environmental factors or outlier telematics factors on the output data parameters associated with telematics data. For example, correcting for tire pressure, air temperature, or other input parameters, a fuel efficiency of the vehicle that is due to the vehicle operator may be determined and compared to other vehicles of the vehicle population. Operation 216 may be performed by the data analysis module for each vehicle of the vehicle population.

At 218, the method includes determining and assigning a relative score to the one or more normalized output data parameters for the vehicle. As an example, a relative score may be determined for an output data parameter (e.g., fuel efficiency), for a particular vehicle, by comparing the normalized output data parameter for that vehicle to a domain and/or average for that normalized output data parameter identified across the vehicle population. Here, the relative score identified and assigned to an output data parameter (e.g., fuel efficiency) for a particular vehicle serves as a value that enables comparison with the output data parameter for the vehicle population. As an example, upper and lower bounds for a domain of an output data parameter for a vehicle population may correspond to relative scores 20 and 80, respectively, with an average of 50; and a particular vehicle having a higher than average normalized output data parameter may be assigned a relative score of 75. Operation 218 may be performed for each vehicle of the vehicle population, and may be performed for some or all of the output data parameters.

At 220, the method includes outputting and/or publishing the relative score assigned to each of the one or more output data parameters for each vehicle of the vehicle population. Operation 220 may be performed by the data analysis module and/or a data publication module (e.g., 118 of FIG. 1) of the telematics service. As an example, the data analysis module may output the relative scores for storage in a database system by the data storage module (e.g., 114 of FIG. 1), and/or for publication by the data publication module. Publication may include transmitting the relative scores to subscribers and/or enabling the subscribers to request and access the relative scores from a database system.

FIG. 2B is a flow diagram depicting an example method 222 for a telematics service. Method 222 may be used in combination with or as an alternative to previously described method 200 of FIG. 2A. As a non-limiting example, method 222 may be performed by the previously described telematics service 110 of FIG. 1. Accordingly, method 222 may take the form of a computer-implemented method. As a non-limiting example, method 222 may be implemented by a server system that includes one or more server devices.

At 224, the method includes obtaining a telematics dataset for each vehicle of a vehicle population. For example, thousands of telematics datasets may be obtained for a vehicle population of hundreds, thousands, millions, or more vehicles over a period of time. The telematics datasets may be received by the telematics service over a communications network, such as a wide area network (e.g., the Internet) with which the telematics services is connected. As an example, the telematics datasets may be transmitted from the vehicles over wireless links that form edge components of the wide area network.

The method at 224 may additionally include obtaining one or more other datasets from other sources of data, including environmental datasets from non-vehicle-based data sources (e.g., data sources 140 of FIG. 1). Non-limiting examples of non-vehicle-based sources include geographically distributed sensors that measure environmental conditions within a geographic region or location of interest (e.g., where a subject vehicle is present).

Each dataset may include measurements for one or more measurement types. Each measurement type may refer to a corresponding data parameter. For example, a telematics dataset may include measurements for a measurement type that corresponds to a fuel level data parameter within a fuel tank of a vehicle as measured by a fuel level sensor. As another example, an environmental dataset may include measurements for a measurement type that corresponds to an ambient air temperature data parameter for a particular geographic location. Measurements of a dataset may include time-based measurements for one or more measurement types. For example, the previously described measurements for fuel level may include time-based measurements of the fuel level within the vehicle that represent the fuel level decreasing over time due to operation of the vehicle along with periodic increases of the fuel level that represent refueling events.

Typically, a telematics dataset includes many different measurement types or all measurement types reported by the vehicle over the OBD interface and/or measured via sensors located on-board the vehicle (including sensors integrated with a vehicle-based telematics device). Accordingly, a telematics dataset may include tens, hundreds, thousands, or more measurement types that are associated with time values that provide time-based measurements for each of the many telematics measurement types. Similarly, an environmental dataset may include tens, hundreds, thousands or more measurement types that are associated with time values that provide time-based measurements for each of the many environmental measurement types.

At 226, the method includes identifying one or more sets of time-based measurements within each telematics dataset reported by a vehicle. As an example, a telematics dataset may be analyzed or parsed to identify a set of time-based measurements for an individual measurement type, such as a set of time-based measurements of a fuel level or other suitable vehicle parameter. As previously stated, a telematics dataset may include tens, hundreds, thousands, or more time-based measurements of any suitable number of measurement types. Identifiers contained within the telematics dataset may be used to indicate the measurement type or vehicle parameter for each set of time-based measurements.

At 228, the method includes identifying a vehicle identifier for each telematics dataset. As a non-limiting example, a vehicle identifier may include a VIN of the vehicle and/or an identifier of a vehicle-based telematics system of the vehicle, such as an international mobile subscriber identifier (IMSI), a hardware identifier, a software identifier, or other suitable identifier. In a first implementation, the vehicle identifier may be included within the telematics dataset or may accompany the telematics dataset in one or more messages communicated over a communications network. In a second implementation, the vehicle identifier may be associated with the telematics dataset by the sender of the telematics dataset (e.g., the vehicle-based telematics system) or a receiver of the telematics dataset (e.g., a component of the telematics service) based on session information of a communications session established with the sender of the telematics dataset.

At 230, the method includes assigning each vehicle to one or more vehicle populations. In an example, a vehicle identifier for each vehicle may take the form of a VIN that indicates the make, model, and year of production of the vehicle. A vehicle population may be defined to include only those vehicles of a particular make, model, and/or year of production, for example. In another example, the telematics service may create vehicle groups by analyzing telematics data reported by a plurality of diverse vehicles, and grouping vehicles based on similarities in their reported telematics data. Here, a variety of analytical methods may be used, such as k-means clustering or other suitable technique. The telematics service may create any suitable quantity of populations, which may in turn have one or more narrower subset populations and/or one or more broader superset populations.

As an example, the population of vehicles referred to in previously described operations 224, 226, and 228 may be a subset of a broader population of vehicles. These operations may additionally or alternatively be performed for the broader population by obtaining a set of vehicle telematics data for each vehicle of the broader population of vehicles, identifying one or more of a vehicle make, vehicle model, and/or vehicle year of production of each vehicle of the broader population of vehicles based on a vehicle identifier contained within each set of vehicle telematics data, and defining the subset of the broader population as being limited to vehicles that share one or more of a similar vehicle make, a similar vehicle model, or a similar vehicle year of production with each other.

In a first example, a subset of the broader population is limited to vehicles that share two or more of a similar vehicle make, a similar vehicle model, or a similar vehicle year of production with each other. In another example, the subset of the broader population is limited to vehicles that share three of a similar vehicle make, a similar vehicle model, or a similar vehicle year of production with each other. In yet another example, the subset of the broader population is limited to vehicles that share a similar vehicle make and a similar vehicle model with each other, and are within a predefined range of a vehicle year of production from each other.

At 232, the method includes combining the set of time-based measurements for each vehicle of the vehicle population to obtain a combined set of time-based observations for a measurement type across the vehicle population. As previously described, a vehicle population may take the form of a broad population of vehicles (e.g., all vehicles or a large mix of diverse vehicles) served by the telematics service. Additionally or alternatively, a vehicle population may take the form of a subset of the broad population of vehicles, such as vehicles that exhibit one, two, three, or more similar or identical characteristics of vehicle make, vehicle model, vehicle year of production, etc. In this example, the combined set of time-based observations for the measurement type may be limited to the subset of the broader population. The telematics service may support any suitable quantity of vehicle populations, including tens, hundreds, thousands, or more individual populations. Operation 232 may be performed for each vehicle population of which a vehicle is a member, including a broad population and subset population(s) of that broad population.

At 234, the method includes processing the combined set of time-based measurements. This processing of combined measurements may include applying a statistical model to the combined set of time-based observations to obtain a set of one or more probability distributions. In some implementations, the method at 234 may further include generating the statistical model for the population of vehicles by defining one or more probability distributions based on an attribute of the combined set of time-based observations. The previously described operations 222-232 may be repeated as new telematics data is received from vehicle-based telematics systems to update statistical models and/or to create new populations of vehicles.

At 236, the method includes identifying one or more outlier observations from among the combined set of time-based measurements. As an example, the method at 236 may include identifying an outlier observation from among the combined set of time-based observations that is located outside of the set of one or more probability distributions. A combined set of time-based measurements may include two or more outlier observations that are members of the same set of time-based measurements obtained from the same vehicle and/or two or more outlier observations that are members of two or more different sets of time-based measurements obtained from different vehicles.

At 238, the method includes identifying one or more vehicle identifiers attributed to the one or more outlier observations. Outlier observations that are members of the same set of time-based measurements may be grouped with a vehicle identifier for the vehicle from which that set of time-bases measurements originated. Vehicle identifiers may be associated with their respective set of time-based measurements for the measurement type being analyzed.

At 240, the method includes determining whether each outlier observation is a temporary deviation or a persistent deviation. Typically, a temporary deviation in comparison to other vehicles of a population represents a vehicle-specific condition that momentarily causes inaccurate or anomalous measurements of a measurement type. By contrast, a persistent deviation typically represents a vehicle-specific condition such as a degraded or faulty component or a performance parameter of the vehicle (e.g., fuel efficiency score).

The determination at 240 may be based on one or more factors, such as a time-based duration of the deviation for the outlier observations for a vehicle, a time-density or quantity of outlier observations within a period of time for the vehicle, and a direction of the deviation from a normalized value or range of values, among other suitable factors. Each measurement type may have a different threshold for time-based duration, time-density, and/or directional factors. As an example, time-based durations and/or time-densities that exceed one or more of these thresholds may be determined to be persistent deviations, and alternatively may be determined to be temporary deviations if one or more of these factors do not exceed the thresholds. Deviations in a first direction from a normalized value or range of values may be judged against a different threshold than deviations in a second direction that is opposite the first direction.

At 242, if an outlier observation is determined to be a temporary deviation, the method includes reducing an impact of the outlier observation on the set of time-based measurements to obtain an augmented set of time-based measurements. The telematics service may programmatically perform operation 242 responsive to determining that the outlier observation is a temporary deviation. As an example, reducing the impact of the outlier observation on the set of time-based measurements includes filtering the outlier observation from the set of time-based measurements. As another example, reducing the impact of the outlier observation on the set of time-based measurements includes modifying a value of the outlier observation to be within or closer to the set of one or more probability distributions.

At 244, if an outlier observation is determined to be a persistent deviation, the method includes characterizing the outlier observation or the group of outlier observations that are members of the persistent deviation. The telematics service may programmatically perform operation 244 responsive to determining that the outlier observation is a persistent deviation. In some implementations, the telematics service may perform both operations 242 and 244 to provide two or more alternative analyses for consumption by a subscriber.

In an example, characterization of a persistent deviation may include indicating that a defective or degraded component of a vehicle identified by the vehicle identifier attributed to the outlier observation is responsible for the persistent deviation, and/or indicating that a servicing task is due for a vehicle identified by the vehicle identifier attributed to the outlier observation. Characterizations of outlier observations may be predefined within a database system and may be selected by the telematics service based on one or more factors such as measurement type, a magnitude of the deviation of the outlier observation from a normalized value or range of values for the population, a direction of the deviation of the outlier observation from the normalized value or range of values for the population, and a time-based duration of the deviation, among other suitable factors. As a non-limiting example, a persistent deviation in a fuel level of a vehicle in a direction that corresponds to a lower than expected fuel level may be programmatically characterized as a fuel leak, whereas a persistent deviation in a fuel level of the vehicle in a direction that corresponds to a greater than expected fuel level may be programmatically characterized as a malfunctioning fuel level sensor.

At 246, the method includes outputting the augmented set of time-based measurements and/or the characterization of the persistent deviation. Within this context, outputting may include storing in a data store that is accessible to subscribers and/or forwarding information to subscribers associated with particular vehicle identifiers. Such information may include or may be based on the augmented set of time-based measurements and/or the characterization of the persistent deviation. In some implementations, an augmented set of time-based measurements may take the form of a relative score, such as previously described with reference to operation 220 of FIG. 2A. For example, a relative score may be determined and assigned to the augmented set of time-based measurements that is based on a value of the augmented set of time-based measurements relative to the combined set of time-based measurements. The augmented set of time-based measurements may be output as the relative score to enable comparison with the relative score of other vehicles for that same measurement type.

Figure 3:
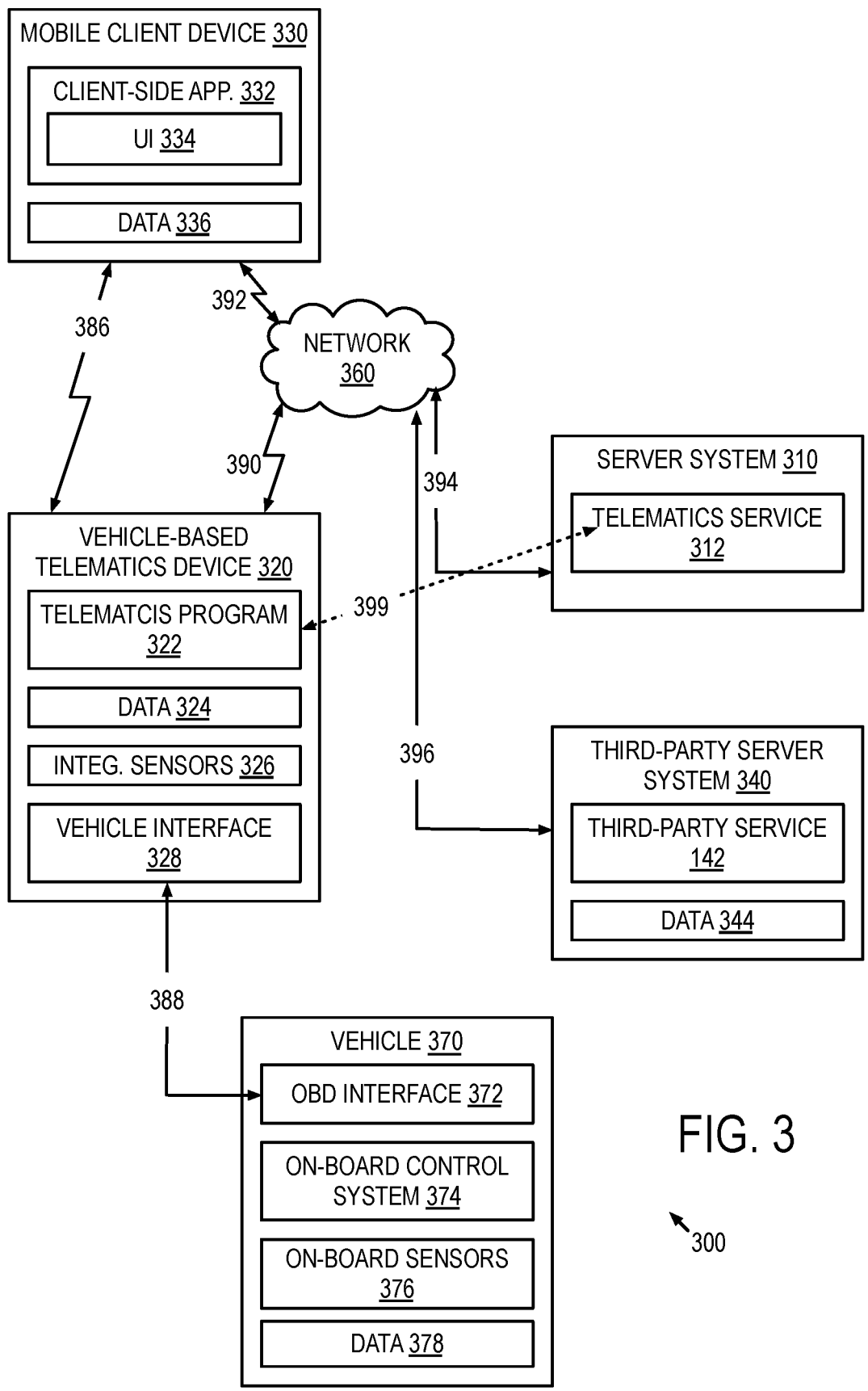
FIG. 3 is a schematic diagram depicting an example computing system.

FIG. 3 is a schematic diagram depicting an example computing system 300. Within computing system 300, a server system 310 hosts a telematics service 312 that receives telematics data from vehicle-based telematics systems. A vehicle-based telematics system may include a vehicle-based telematics device, such as example vehicle-based telematics device 320 and/or an electronic control and monitoring system of a vehicle, such as on-board control system 374 and on-board sensors 376, or a combination of a vehicle-based telematics device and an electronic control and management system of the vehicle. Telematics service 312 is a non-limiting example of previously described telematics service 110 of FIG. 1.

Telematics service 312 may serve an ecosystem of many vehicle-based telematics systems that are located on-board respective vehicles. These vehicles may include a broad range of vehicles having a variety of different makes, models, and years of production. Telematics service 312 processes data reported by vehicle-based telematics systems and provides processed forms of that reported data and/or analysis results to subscribers. As an example, mobile client device 330 may subscribe to telematics service 312 to receive data reported by vehicle-based telematics device 320. As another example, a third-party service 342 hosted at a third-party server system 340 may subscribe to telematics service 312 to receive data reported by at least some of the vehicle-based telematics devices served by telematics service 312, such as example vehicle-based telematics device 320. Third-party service 342 may in turn provide additional services to clients of the third-party server system.

Within computing system 300, computing devices may communicate with each other via a network 360. Network 360 may include a wide-area network (e.g., such as the Internet or a portion thereof), which includes wired and/or wireless network components. Additionally or alternatively, some computing devices may communicate with each other over personal or local area network components that do not traverse network 360. As an example, mobile client device 330 may communicate with telematics device 320 via a wireless personal area network or a local area network as indicated at 386. As another example, telematics device 320 may communicate with a vehicle 370 via a wired or wireless personal area network or local area network as indicated at 388.

Vehicle 370 includes an OBD interface 372 that enables telematics device 320 to communicate with one or more subsystems of the vehicle, such as on-board control system 374 and/or on-board sensors 376, as indicated at 388. As an example, vehicle 370 may provide data 378 to telematics device 320 or receive data 324 from telematics device 320 via OBD interface 372. Vehicle 370 is typically a ride-on road-based vehicle that enables one or more passengers to be transported on-board the vehicle. However, vehicle 370 may take a variety of different forms, including a land-based wheeled, rail, or track vehicle (e.g., car, truck, bus, tractor, train, locomotive, motorcycle, four-wheeler, snowmobile, etc.), an aircraft (e.g., airplane, helicopter, etc.), a marine vessel (e.g., boat or personal watercraft), or other suitable vehicle type.

Telematics device 320 includes a vehicle interface 328 that interfaces with OBD interface 372 of vehicle 370. In wired configurations, vehicle interface 328 may include an electronic connector that mates with a corresponding electronic connector of OBD interface 372 to enable telematics device 320 to send and/or receive communications to and/or from vehicle 370 over a wired communications link. In a wireless configuration, vehicle interface 328 may include a wireless transmitter and/or receiver that enables telematics device 320 to send and/or receive wireless communications to and/or from a wireless receiver and/or transmitter of OBD interface 372. Communications between telematics device 320 and vehicle 370, indicated at 388, may be unidirectional (e.g., from the vehicle to the telematics device) or bidirectional.

Telematics device 320 further includes a telematics program 322 executed by the telematics device, data 324 stored thereon, and optionally one or more integrated sensors 326. Telematics program 322 receives and/or generates telematics data (e.g., data 324 and/or data 378) representing measurements of real-world vehicle telematics events as measured by on-board sensors 376 of vehicle 370 and/or by integrated sensors 326 (if present). Telematics program 322 provides reports of telematics data to telematics service 312, as indicated by communications path 399. In at least some implementations, a vehicle-based telematics device located on-board a vehicle may not communicate with the vehicle in any way or may have limited communications with the vehicle. In these implementations, measurement data may represent measurements of real-world vehicle telematics events as measured exclusively by integrated sensors of the telematics device.

Telematics device 320, due to its mobility, typically communicates with other computing devices of network 360 over a wireless communications link of a wireless component of network 360, as indicated at 390. In other examples, telematics device 320 may communicate with computing devices of network 360 over a wired communications link, such as periodically via a wired dock or cable during an off-boarding operation. Similarly, mobile client devices (e.g., such as mobile client device 330), due to their mobility, typically communicate with other computing devices of network 360 over a wireless communications link of a wireless component of network 360, as indicated at 392. However, mobile client devices may also use wired communication links to communicate with computing devices of network 360. Server system 310 and third-party server system 340 communicate with other computing devices of network 360 as indicated at 394 and 396, respectively. Each of server systems 310 and 340 may include one or more server devices that are co-located or geographically distributed.

As previously described, data may be provided by telematics service 312 to subscribers, such as mobile client device 330 and/or third-party server system 340, as indicated by data 336 and data 344. Representations of data 336 may be presented to a user of mobile client device 330 via a user interface 334 of client-side application program 332. Program 332 may take the form of a special-purpose program or a general-purpose program by which a user may receive and interact with data or otherwise access services of telematics service 312 and/or third-party services (e.g., 342). User interface 334 may take the form of a graphical user interface in an example. While mobile client device 330 is described in one example as being a subscriber of telematics service 312, mobile client device 330 may alternatively or additionally be a subscriber of third-party service 342.

Figure 4:
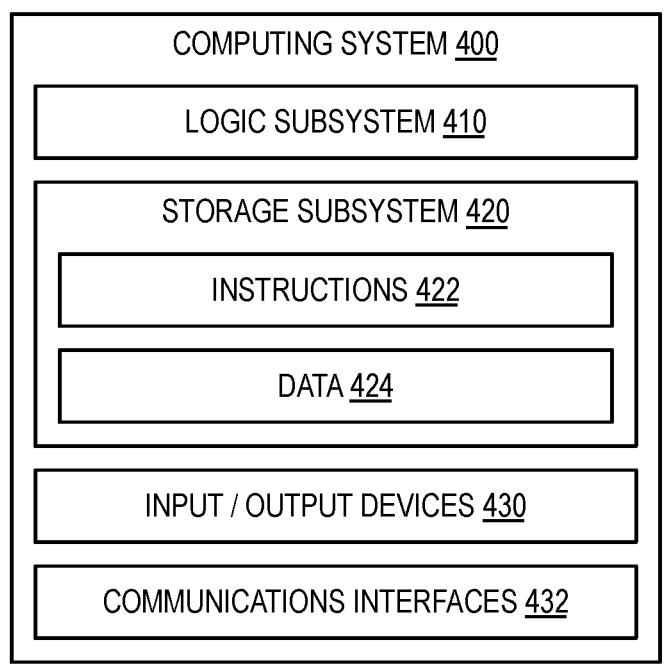
FIG. 4 is a schematic diagram depicting another example computing system.

FIG. 4 is a schematic diagram depicting an example computing system 400 that includes one or more computing devices. Computing system 400 is a non-limiting example of computing system 300 of FIG. 3 or a computing device thereof. Computing system 400 may be configured (e.g., via instructions) to implement the telematics service and perform the methods, processes, and operations described herein. FIG. 4 depicts computing system 400 in simplified form. A computing system or a computing device thereof may take a variety of different forms including a personal computer, a server computer, a wireless device, a personal electronic device, a vehicle-based telematics device, a vehicle-based telematics system, and/or other electronic devices that incorporate computer hardware and software.

A logic subsystem, such as example logic subsystem 410, may include one or more physical logic devices configured to execute instructions stored or otherwise held in a storage subsystem, such as example storage subsystem 420. For example, a logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

A logic subsystem may include one or more processors (as an example of physical logic devices) configured to execute software instructions, such as example instructions 422. Additionally or alternatively, the logic subsystem may include one or more logic machines (as an example of physical logic devices) configured to execute hardcoded instructions. Processors of the logic subsystem may be single-core or multi-core. Instructions executed by the logic subsystem may be configured for sequential, parallel, and/or distributed processing. Individual components of the logic subsystem may be distributed among two or more separate devices, which may be remotely located and/or configured for coordinated processing. Aspects of the logic subsystem may be virtualized and executed by remotely accessible, networked computing devices configured in a cloud-computing configuration.

A storage subsystem includes one or more physical memory devices configured to hold instructions or other forms of data. These one or more physical memory devices may take the form of non-transitory memory devices configured to hold instructions or other forms of data in non-transitory form. As previously discussed, instructions are executable by a logic subsystem, to implement the methods, processes, and operations described herein. While instructions may be held in non-transitory form, such non-transitory instructions may be updated from time to time to add, remove, or modify the methods, processes, and operations performed by the computing device upon execution of the instructions. While a storage subsystem includes one or more physical devices, aspects of the instructions and/or other forms of data described herein may, at times, be propagated by a communication medium (e.g., an electromagnetic signal, an optical signal, etc.) that is not necessarily held by a physical device for a finite duration.

Aspects of a logic subsystem and a storage subsystem may be integrated together into one or more hardware-logic components. Such hardware-logic components may include field-programmable gate arrays (FPGAs), program-specific and application-specific integrated circuits (PASIC/ASICs), program-specific and application-specific standard products (PSSP/ASSPs), system-on-a-chip (SOC), and complex programmable logic devices (CPLDs), as non-limiting examples.

One or more physical memory devices of a storage subsystem may be configured to hold other forms of data in data store or data storage. When the methods, processes, or operations described herein are implemented, the state of the storage subsystem may be transformed—e.g., to hold different data. A storage subsystem may include removable and/or built-in devices. A storage subsystem may include optical memory devices, semiconductor memory devices, and/or magnetic memory devices, among other suitable forms. A storage subsystem may include volatile, nonvolatile, dynamic, static, read/write, read-only, random-access, sequential-access, location-addressable, file-addressable, and/or content-addressable devices.

Terms such as "module" or "program," may be used to describe an aspect of a computing system implemented to perform a particular function. In some cases, a module or program may be instantiated via a logic subsystem executing instructions held by a storage subsystem. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms module and program may encompass individual or groups of executable files, data files, libraries, drivers, scripts, database records, etc. The term service may be used refer to an application program, module, or other instruction set executable across multiple sessions, e.g., of a user account or a telematics device. A service may be available to one or more system components, programs, and/or other services. In some implementations, a service may run on one or more server devices of a server system.

Computing system 400 may further include or interface with one or more input and/or output devices 430. Non-limiting examples of input devices include a sensor, a touch-sensitive graphical display device, a keyboard, a computer mouse, a microphone, an optical sensor, an accelerometer/gyro/inertial sensor, etc. Non-limiting examples of output devices include a graphical display device, an audio speaker, a haptic feedback device, etc.

Computing system 400 may further include one or more communications interfaces 432. Non-limiting examples of communications interfaces include wired and/or wireless communications interfaces that support wired and/or wireless communications over wide area networks, local area networks, or personal area networks using any suitable communications protocol, including OBD protocols, cellular protocols, WLAN protocols, Internet protocols, etc.

While the present disclosure uses examples of vehicle-based telematics within the context of a telematics service, in other implementations the vehicle-based telematics systems and their reported telematics data may be substituted with Internet of Things (IoT) devices having integrated sensors that report measurement data over a communications network. Accordingly, the present disclosure is not limited to use with vehicle-based telematics data, but may be extended to non-vehicle-based devices that are capable of reporting sensor measurements or other forms of data to the telematics service.

It will be understood that the configurations and/or approaches described herein are exemplary in nature, and that these specific examples or implementations are not to be considered in a limiting sense, because numerous variations are possible. The specific methods described herein may represent one or more of any number of processing strategies. As such, various acts illustrated and/or described may be performed in the sequence illustrated and/or described, in other sequences, in parallel, or omitted. Likewise, the order of the above-described methods may at times be changed.

The subject matter of the present disclosure includes all novel and nonobvious combinations and sub-combinations of the various configurations, approaches, systems, methods, and other features, functions, acts, and/or properties disclosed herein, as well as any and all equivalents thereof.

The invention claimed is:

1. A method performed by a computing system implementing a telematics service, the method comprising:
   obtaining a set of vehicle telematics data for each vehicle of a population of vehicles,
   wherein for each vehicle of the population, the set of vehicle telematics data is obtained by receiving communications transmitted from a vehicle-based telematics device of that vehicle via a wireless communications network;
   identifying, within each set of vehicle telematics data, a vehicle identifier of the vehicle from which that set of vehicle telematics data originated and a set of time-based measurements for a measurement type indicated by a measurement type identifier contained within that set of vehicle telematics data, the set of time-based measurements for each vehicle captured by one or more sensors of the vehicle-based telematics device of that vehicle;
   combining the set of time-based measurements identified for each vehicle to obtain a combined set of time-based observations for the measurement type indicated by the measurement type identifier contained in each set of vehicle telematics data across the population of vehicles;
   applying a statistical model to the combined set of time-based observations to obtain a set of one or more probability distributions;
   identifying an outlier observation from among the combined set of time-based observations that is located outside of the set of one or more probability distributions;
   for the outlier observation, identifying the vehicle identifier attributed to the outlier observation;
   determining that the outlier observation is part of a temporary deviation;
   responsive to the outlier observation being part of a temporary deviation, reducing an impact of the outlier observation on the set of time-based measurements of which the outlier observation is a member to obtain an augmented set of time-based measurements; and
   outputting the augmented set of time-based measurements by forwarding the augmented set of time-based measurements to a subscriber associated with the vehicle identifier attributed to the outlier observation.

2. The method of claim 1, wherein the population of vehicles is a subset of a broader population of vehicles, and wherein the method further comprises:
   obtaining a set of vehicle telematics data for each vehicle of the broader population of vehicles;
   identifying one or more of a vehicle make, vehicle model, and/or vehicle year of production of each vehicle of the broader population of vehicles based on a vehicle identifier contained within each set of vehicle telematics data; and
   defining the subset of the broader population as being limited to vehicles that share one or more of a similar vehicle make, a similar vehicle model, or a similar vehicle year of production with each other;
   wherein the combined set of time-based observations for the measurement type is limited to the subset of the broader population.

3. The method of claim 2, wherein the subset of the broader population is limited to vehicles that share two or more of a similar vehicle make, a similar vehicle model, or a similar vehicle year of production with each other.

4. The method of claim 2, wherein the subset of the broader population is limited to vehicles that share three of a similar vehicle make, a similar vehicle model, or a similar vehicle year of production with each other.

5. The method of claim 2, wherein the subset of the broader population is limited to vehicles that share a similar vehicle make and a similar vehicle model with each other, and are within a predefined range of a vehicle year of production from each other.

6. The method of claim 1, further comprising:
   generating the statistical model for the population of vehicles by defining the one or more probability distributions based on an attribute of the combined set of time-based observations.

7. The method of claim 1, wherein reducing the impact of the outlier observation on the set of time-based measurements includes filtering the outlier observation from the set of time-based measurements.

8. The method of claim 1, wherein reducing the impact of the outlier observation on the set of time-based measurements includes modifying a value of the outlier observation to be within or closer to the set of one or more probability distributions.

9. The method of claim 1, further comprising:
   upon determining that the outlier observation is part of a temporary deviation, assigning an operational score to the vehicle identifier based on the augmented set of time-based measurements, and outputting the operational score.

10. The method of claim 1, further comprising:
    assigning a relative score to the augmented set of time-based measurements that is based on a value of the augmented set of time-based measurements relative to the combined set of time-based measurements; and
    wherein outputting the augmented set of time-based measurements includes outputting the relative score.

11. A computing system including one or more computing devices, comprising:
    a logic subsystem including one or more physical logic devices; and
    a storage subsystem including one or more physical memory devices having instructions stored thereon executable by the one or more physical logic devices processors of the logic subsystem to:
    obtain a set of vehicle telematics data for each vehicle of a population of vehicles,
    wherein for each vehicle of the population, the set of vehicle telematics data is obtained by receiving communications transmitted from that vehicle by a vehicle-based telematics device via a wireless communications network;
    identify, within each set of vehicle telematics data, a vehicle identifier of the vehicle from which that set of vehicle telematics data originated and a set of time-based measurements for a measurement type indicated by a measurement type identifier contained within that set of vehicle telematics data, the set of time-based measurements for each vehicle captured by one or more sensors of the vehicle-based telematics device of that vehicle;
    combine the set of time-based measurements identified for each vehicle to obtain a combined set of time-based observations for the measurement type indicated by the measurement type identifier contained in each set of vehicle telematics data across the population of vehicles;

apply a statistical model to the combined set of time-based observations to obtain a set of one or more probability distributions;
identify an outlier observation from among the combined set of time-based observations that is located outside of the set of one or more probability distributions;
for the outlier observation, identify the vehicle identifier attributed to the outlier observation;
determine whether the outlier observation is part of a temporary deviation or a persistent deviation;
if the outlier observation is part of a temporary deviation, then reduce an impact of the outlier observation on the set of time-based measurements of which the outlier observation is a member to obtain an augmented set of time-based measurements;
if the outlier is part of a persistent deviation, then programmatically characterize the outlier observation based, at least in part, on the set of time-based measurements of which the outlier observation is a member to obtain a characterization of the persistent deviation; and
output the augmented set of time-based measurements and/or the characterization of the persistent deviation by forwarding the augmented set of time-based measurements to a subscriber associated with the vehicle identifier attributed to the outlier observation.

12. The computing system of claim 11, wherein the impact of the outlier observation on the set of time-based measurements is reduced by:
filtering the outlier observation from the set of time-based measurements, or
modifying a value of the outlier observation to be within or closer to the set of one or more probability distributions.

13. The computing system of claim 11, wherein the instructions are further executable by the one or more physical logic devices of the logic subsystem to:
if the outlier observation is part of a temporary deviation, assign an operational score to the vehicle identifier based on the augmented set of time-based measurements, and outputting the operational score; and
if the outlier is part of a persistent deviation, assign the operational score to the vehicle identifier based on the set of time-based measurements in which the operational score is output as the characterization of the persistent deviation.

14. The computing system of claim 11, wherein the population of vehicles is a subset of a broader population of vehicles, and wherein the instructions are further executable by the one or more physical logic devices of the logic subsystem to:
obtain a set of vehicle telematics data for each vehicle of the broader population of vehicles;
identify one or more of a vehicle make, vehicle model, and/or vehicle year of production of each vehicle of the broader population of vehicles based on a vehicle identifier contained within each set of vehicle telematics data; and
define the subset of the broader population as being limited to vehicles that share one or more of a similar vehicle make, a similar vehicle model, or a similar vehicle year of production with each other;
wherein the combined set of time-based observations for the measurement type is limited to the subset of the broader population.

15. A method performed by a computing system implementing a telematics service, the method comprising:
obtaining a set of vehicle telematics data for each vehicle of a population of vehicles,
wherein for each vehicle of the population, the set of vehicle telematics data is obtained by receiving communications transmitted from a vehicle-based telematics device of that vehicle via a wireless communications network;
identifying, within each set of vehicle telematics data, a vehicle identifier of the vehicle from which that set of vehicle telematics data originated and a set of time-based measurements for a measurement type indicated by a measurement type identifier contained within that set of vehicle telematics data, the set of time-based measurements for each vehicle captured by one or more sensors of the vehicle-based telematics device of that vehicle;
combining the set of time-based measurements identified for each vehicle to obtain a combined set of time-based observations for the measurement type indicated by the measurement type identifier contained in each set of vehicle telematics data across the population of vehicles;
applying a statistical model to the combined set of time-based observations to obtain a set of one or more probability distributions;
identifying an outlier observation from among the combined set of time-based observations that is located outside of the set of one or more probability distributions;
for the outlier observation, identifying the vehicle identifier attributed to the outlier observation;
determining that the outlier observation is part of a persistent deviation;
responsive to the outlier observation being part of a persistent deviation, programmatically characterizing the outlier observation based, at least in part, on the set of time-based measurements of which the outlier observation is a member to obtain a characterization of the persistent deviation; and
outputting by forwarding the characterization of the persistent deviation to a subscriber associated with the vehicle identifier attributed to the outlier observation.

16. The method of claim 15, wherein the characterization of the persistent deviation includes an indication that a defective or degraded component of a vehicle identified by the vehicle identifier attributed to the outlier observation is responsible for the persistent deviation.

17. The method of claim 15, wherein the characterization of the persistent deviation includes an indication that a servicing task for a vehicle identified by the vehicle identifier attributed to the outlier observation is due.

18. The method of claim 15, further comprising:
identifying another outlier observation from among the combined set of time-based observations that is located outside of the set of one or more probability distributions;
for the other outlier observation, identifying the vehicle identifier attributed to the other outlier observation;
determining that the other outlier observation is part of a temporary deviation;
responsive to the other outlier observation being part of a temporary deviation, reducing an impact of the other outlier observation on the set of time-based measurements of which the other outlier observation is a member to obtain an augmented set of time-based measurements; and outputting the augmented set of time-based measurements by forwarding the augmented set of time-based measurements to another subscriber associated with the vehicle identifier attributed to the other outlier observation.

19. The method of claim 15, further comprising:
upon determining that the outlier is part of a persistent deviation, assigning the operational score to the vehicle identifier based on the set of time-based measurements in which the operational score is output as the characterization of the persistent deviation.

20. The method of claim 15, wherein the population of vehicles is a subset of a broader population of vehicles, and wherein the method further comprises:
obtaining a set of vehicle telematics data for each vehicle of the broader population of vehicles;
identifying one or more of a vehicle make, vehicle model, and/or vehicle year of production of each vehicle of the broader population of vehicles based on a vehicle identifier contained within each set of vehicle telematics data; and
defining the subset of the broader population as being limited to vehicles that share one or more of a similar vehicle make, a similar vehicle model, or a similar vehicle year of production with each other;
wherein the combined set of time-based observations for the measurement type is limited to the subset of the broader population.

* * * * *